United States Patent
Sakata et al.

(10) Patent No.: US 8,628,057 B2
(45) Date of Patent: Jan. 14, 2014

(54) LOCKING MECHANISM FOR VALVE DEVICE

(75) Inventors: Yukinobu Sakata, Shioya-gun (JP); Takuya Wakabayashi, Wako (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 13/435,475

(22) Filed: Mar. 30, 2012

(65) Prior Publication Data

US 2012/0248350 A1    Oct. 4, 2012

(30) Foreign Application Priority Data

Mar. 31, 2011   (JP) .................................. 2011-077340

(51) Int. Cl.
*F16K 31/44*   (2006.01)

(52) U.S. Cl.
USPC ............................ 251/297; 251/305; 251/230

(58) Field of Classification Search
USPC .............................. 251/230, 297, 305; 74/575
See application file for complete search history.

(56) References Cited

U.S. PATENT DOCUMENTS 3,376,894 A * 4/1968 Broerman ................ 137/625.48
5,969,588 A * 10/1999 Nelson ............................ 335/229

FOREIGN PATENT DOCUMENTS

JP       2005-069391 A      3/2005

* cited by examiner

*Primary Examiner* — John K Fristoe, Jr.
*Assistant Examiner* — Kevin E Lynn
(74) *Attorney, Agent, or Firm* — Westerman, Hattori, Daniels & Adrian, LLP (57) ABSTRACT

Disclosed herein is a locking mechanism for a valve device having a valve body for retaining the valve body at a predetermined opened position, including: a disk having a rotational shaft rotatable together with a valve body driving shaft and having a cutout groove formed on an outer circumferential face thereof; a ball disposed in the cutout groove; a body member having an axial direction restriction face and an inner circumferential face; a holder member having an engaging face which has a diameter gradually decreasing toward the ball and is engageable with the ball; and a spring member biasing the holder member toward the ball, wherein said ball is clamped by and among the engaging face which is acted upon by the biasing force of said spring member, the axial direction restriction face and the inner circumferential face so that a rotational direction position of the rotational shaft is retained.

12 Claims, 4 Drawing Sheets

LOCKING MECHANISM FOR VALVE DEVICE

CROSS REFERENCES TO RELATED APPLICATIONS

The present disclosure contains subject matter related to that disclosed in Japanese Priority Patent Application JP 2011-077340 filed in the Japan Patent Office on Mar. 31, 2011, the entire contents of which is hereby incorporated by reference.

FIELD OF THE INVENTION

This invention relates to a locking mechanism for a valve device, and more particularly to a locking mechanism for retaining a valve body of a valve device, whose valve body is configured to open and close a fluid path, at a predetermined opening position.

BACKGROUND OF THE INVENTION

In recent years, fuel cells wherein hydrogen is supplied to an anode and air which contains oxygen is supplied to a cathode to generate power are being developed energetically. In a system which uses such a fuel cell as just described, a valve device having a valve body for opening and closing a fluid path in which fluid such as hydrogen, air which contains oxygen or the like flows is used. A back pressure valve as a valve device is provided on a fluid path of cathode off-gas exhausted from a fuel cell and adjusts the pressure of the cathode off-gas exhausted from the fuel cell to a predetermined pressure. As the back pressure valve, for example, a butterfly valve for carrying out opening and closing of a fluid path by means of a disk-shaped valve body is used, and, in order to maintain the set valve opening in stability, it is necessary to retain the rotational direction position of a valve body driving shaft for driving the valve body.

On the other hand, as a locking mechanism for retaining the rotational direction position of a rotational shaft, an off brake is known and disclosed, for example, in Japanese Patent Laid-Open No. 2005-69391. In the off brake, when it is in an off state, the stator side is connected to the rotor side and a rotary shaft mounted on the rotor side is braked for a braking operation. On the other hand, when the off brake is in an on state, the stator side is disconnected from the rotor side to cancel the braking operation for the rotary shaft.

The off brake described presses, upon deenergization wherein the electromagnet is in a non-excitation state, an armature against the rotor side under elastic force of a braking spring to carry out braking operation. However, upon energization wherein the electromagnet is in an excitation state, the armature is attracted and spaced away from the rotor side to cancel the braking operation. With such an electromagnetic brake as just described, a rotational direction position of the rotary shaft can be retained without energization.

SUMMARY OF THE INVENTION

However, in the technique disclosed in the document mentioned above, the transition from a state, that is, a locked state, in which the rotational direction position of the rotary shaft is retained to another state, that is, an unlocked state, in which the retention of the rotational direction position of the rotary shaft is cancelled, a special driving mechanism such as an electromagnet is required.

A locking mechanism is provided for a valve device wherein a valve body can be retained at a predetermined opened position without energization and a special driving mechanism for cancelling the retention of the valve body at the predetermined opened position is not required.

There is provided a locking mechanism for a valve device, which includes a valve body for opening and closing a fluid path, for retaining the valve body at a predetermined opened position, including a disk having a rotational shaft rotatable together with a valve body driving shaft for driving the valve body and having a cutout groove formed on an outer circumferential face thereof, a ball disposed in the cutout groove, a body member having an axial direction restriction face positioned in an opposed relationship to a first end face of the disk in an axial direction and an inner circumferential face positioned in an opposed relationship to the outer circumferential face of the disk, a holder member having a contacting face which is disposed in an opposed relationship to the second end face of the disk in the axial direction and has a diameter gradually decreasing toward the ball and is engageable with the ball, and a spring member configured to bias the holder member toward the ball, and wherein the ball is clamped by and among the engaging face of the holder member which is acted upon by the biasing force of the spring member, the axial direction restriction face and the inner circumferential face so that a rotational direction position of the rotational shaft is retained.

In the locking mechanism for a valve device, static frictional force is generated between the ball and the point (particularly the three points) which engages with the ball, and a retaining moment or retaining force, which is given as the product of the static frictional force and the distance from the center of rotation to the engaging point with the ball, acts upon the engaging point. The ball is restrained by the retaining moment, and since the restrained ball is positioned in the cutout groove, the rotational direction position of the rotational shaft is retained. Accordingly, the valve body can be retained at the fully open position without energization, and power consumption is reduced. Besides, since no special driving mechanism is required to cancel the retention of the valve body at the fully open position, a simple structure can be implemented and reduction in size and weight and reduction in cost can be anticipated.

In particular, with the locking mechanism for a valve device, the valve body can be retained at the fully open position without energization, and no special driving mechanism for canceling the retention of the valve body at the fully open position is required.

The locking mechanism for a valve device may be configured such that the holder member has a movement restriction portion provided thereon for engaging with the body member to restrict movement of the holder member to the ball side, and in a state in which the retention of the rotational direction position of the rotational shaft is cancelled, the movement restriction portion is engaged with the body member such that the biasing force of the spring member is applied to the body member through the movement restriction portion.

In the locking mechanism for a valve device, in the state in which the retention of the rotational direction position of the rotational shaft is canceled, the biasing force of the spring member is not transmitted to the ball. Therefore, the ball is not restricted in movement thereof. As a result, the rotational shaft and hence the valve body driving shaft can be rotated smoothly with low sliding resistance.

Or, the locking mechanism for a valve device may be configured such that the inner circumferential face of the body member has a protrusion projecting inwardly, and in a state in which the ball is disposed at a position opposed to the protrusion, the ball is clamped by and among the engaging face of the holder member, which receives the biasing force from the spring member, the axial direction restriction face and the protrusion such that the rotational direction position of the rotational shaft is retained.

In the locking mechanism for a valve device, when the rotational shaft of the disk is rotated and the ball disposed in the cutout groove is engaged with the protrusion formed on the inner circumferential face of the body member, the ball is moved inwardly in a radial direction and is engaged with and moved upwardly in the axial direction by the engaging face of the holder member until it is engaged with the axial direction restriction face of the body member. Then, the ball moves the holder member to the opposite side to the axial direction restriction face against the biasing force of the spring member. Thereupon, the ball contacts with and is clamped among the three points engaging with the ball, and consequently, a retaining moment acts upon the engaging points. As a result, the rotational direction position of the rotational shaft is retained.

Or else, the locking mechanism for a valve device may be configured such that the disk has a plurality of cutout grooves; the ball is disposed in each of the plural cutout grooves; and the engaging face of the holder member has a tapering shape having a diameter linearly decreasing toward the ball.

In the present embodiment having such a configuration as described above, the biasing force of the spring member can be distributed to the plural balls by the engaging face of a simple shape. Accordingly, the retaining moment is generated at a number of places equal to the number of the balls, and the rotational shaft is retained stably at the plural places in a circumferential direction. Therefore, the rotational direction position of the rotational shaft can be retained with a higher degree of certainty.

Where the retention of the rotational direction position of the rotational shaft is to be cancelled, rotational driving force higher than retention moment by the clamping of the ball may be generated by a rotational driving source for rotationally driving the valve body driving shaft.

In the locking mechanism for a valve device, only by causing the rotational driving source to generate rotational driving force higher than the retention moment, the retention of the rotational direction position of the rotational shaft can be canceled without the necessity for a special driving mechanism.

The retention moment by the clamping of the ball may be set by a spring load to the spring member.

In the locking mechanism for a valve device, by changing the spring load to the spring member, the retention moment for retaining the rotational direction position of the rotational shaft and hence the valve body driving shaft can be adjusted.

In summary, with the locking mechanism for a valve device, the valve body can be retained at the predetermined opening position without energization and no special driving mechanism for cancelling the retention of the valve body at the predetermined opening position is required.

The above and other features and advantages of the present invention will become apparent from the following description and the appended claims, taken in conjunction with the accompanying drawings in which like parts or elements denoted by like reference characters.

DETAILED DESCRIPTION OF THE INVENTION

In the following, a preferred embodiment of the present invention is described in detail with reference to the accompanying drawings.

Figure 1:
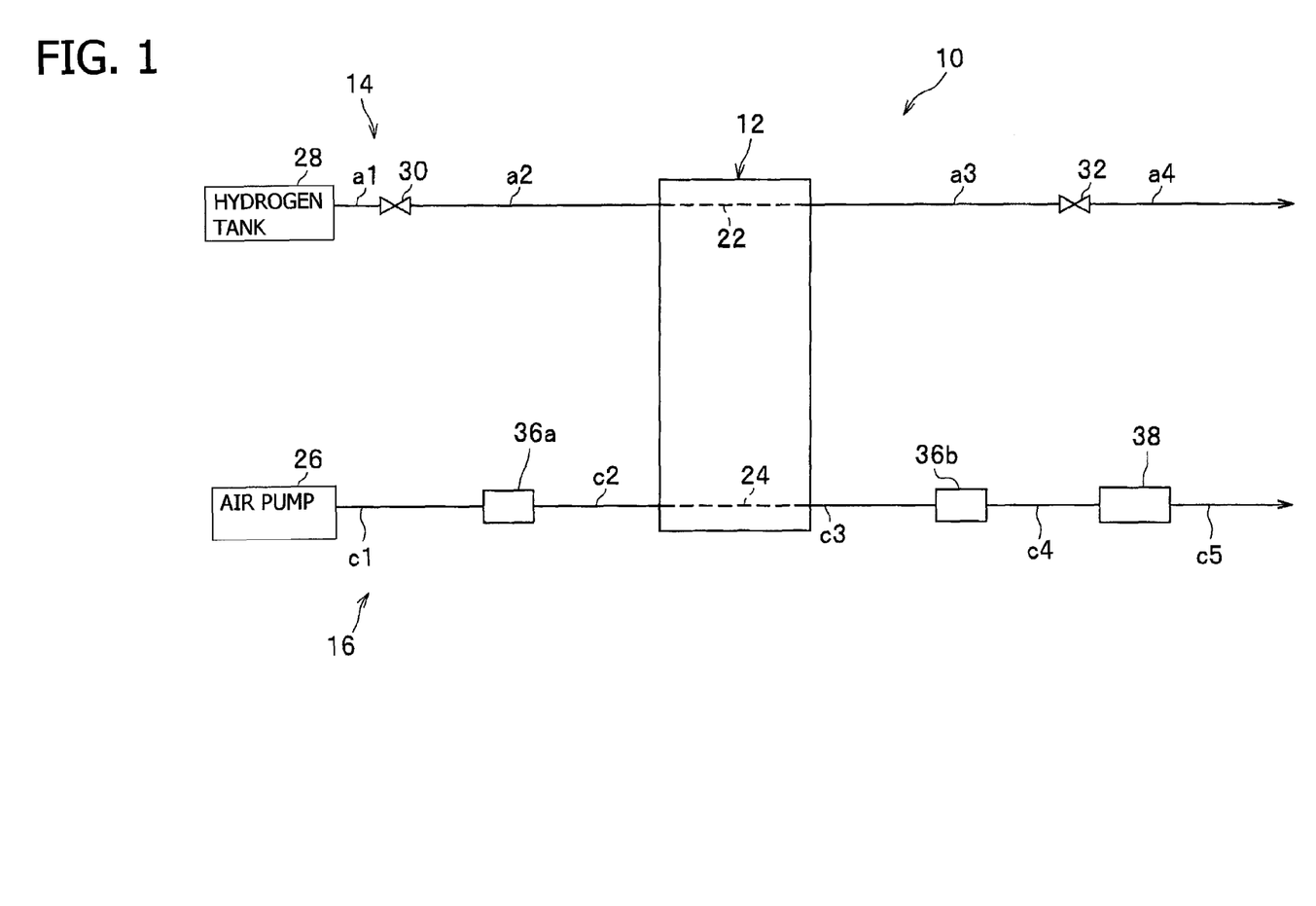
FIG. 1 is a diagrammatic view showing a general configuration of a fuel cell system to which a locking mechanism for a valve device is applied.

FIG. 1 shows a general configuration of a fuel cell system to which a locking mechanism for a valve device is applied. It is to be noted that, although the following description of the present embodiment is directed to a valve device incorporated in a fuel cell mounted on a vehicle as an example, the present invention is not limited to this, but can be applied to various valve devices incorporated in fuel cells for use, for example, with ships, aircrafts and so forth and fuel cells of the stationary type for business use and for domestic use.

Referring to FIG. 1, the fuel cell system 10 to which the locking mechanism for a valve device according to the present embodiment is applied includes a fuel cell 12, an anode system 14, a cathode system 16, a control system (not shown) and so forth. It is to be noted that, in the following description of the present embodiment, the locking mechanism for a valve device is applied to a back pressure valve 38 of the cathode system 16 of the fuel cell system 10.

The fuel cell 12 is formed from a solid polymer electrolyte fuel cell (PEFC) and configured from a plurality of single cells layered with each other and each including a MEA (Membrane Electrode Assembly) sandwiched by separators (not shown). The MEA includes an electrolyte film, that is, a solid polymer film, a cathode and an anode which sandwich the electrolyte film therebetween, and so forth. The cathode and the anode are formed, for example, from an electrode catalyst layer wherein catalyst such as platinum is carried by a catalyst carrier such as carbon black. Meanwhile, in each of the separators, an anode flow path 22 and a cathode flow path 24 each in the form of a groove or a through-hole are formed.

In the fuel cell 12 having such a configuration as described above, if hydrogen as reaction gas or fuel gas is supplied to the anode and the air as reaction gas or oxidant gas containing oxygen is supplied to the cathode, then an electrode reaction occurs on the catalyst contained in the anode and the cathode, and the fuel cell 12 enters a state in which it can generate power.

The fuel cell 12 is electrically connected to an external load (not shown) and generates power if current is extracted from the fuel cell 12 by the external load. It is to be noted that the external load may be a motor for traveling, an electrical storage device such as a battery or a capacitor, an air pump 26 hereinafter described, and so forth.

The anode system 14 is configured from a hydrogen tank 28, a cutoff valve 30, a purge valve 32, pipes a1 to a4, and so forth.

The hydrogen tank 28 stores hydrogen of a high purity in a high pressure condition and is connected to the cutoff valve 30 on the downstream side through the pipe a1. The cutoff valve 30 is configured, for example, from a solenoid valve and is connected to the entrance of the anode flow path 22 of the fuel cell 12 on the downstream side through the pipe a2.

The purge valve 32 is configured, for example, from a solenoid valve and connected to the exit of the anode flow path 22 of the fuel cell 12 through the pipe a3.

The cathode system 16 is configured from an air pump 26, valve devices 36a and 36b, a back pressure valve 38, pipes c1 to c5 serving as oxidant gas flow paths, and so forth.

The air pump 26 is, for example, a mechanical supercharger driven by a motor (not shown), and compresses and supplies external air of gas taken therein to the fuel cell 12.

The valve device 36a is provided on the supply side of oxidant gas and is connected to the air pump 26 on the upstream side through the pipe c1 and connected to the entrance of the cathode flow path 24 of the fuel cell 12 on the downstream side through the pipe c2. Meanwhile, the valve device 36b is provided on the discharge side of oxidant gas and is connected to the exit of the cathode flow path 24 of the fuel cell 12 on the upstream side through the pipe c3 and connected to the back pressure valve 38 on the downstream side through the pipe c4.

It is to be noted that, though not shown in FIG. 1, hydrogen from the pipe a3 is returned to the pipe a2 for recycling. Then, part of the hydrogen is discharged to a diluter (not shown) provided on the pipe c5 at a suitable timing from the pipe a4 so that the hydrogen to be supplied to the fuel cell 12 has an appropriate purity.

The back pressure valve 38 here is a butterfly valve which opens and closes a fluid path by means of a disk-shaped valve body and is connected to the exit side of the cathode flow path 24. The back pressure valve 38 has a function of adjusting the discharge amount of air to be exhausted to the atmospheric air side through the diluter (not shown) on the downstream side and simultaneously controlling the pressure of the air to be supplied to the cathode flow path 24 of the fuel cell 12.

Figure 2:
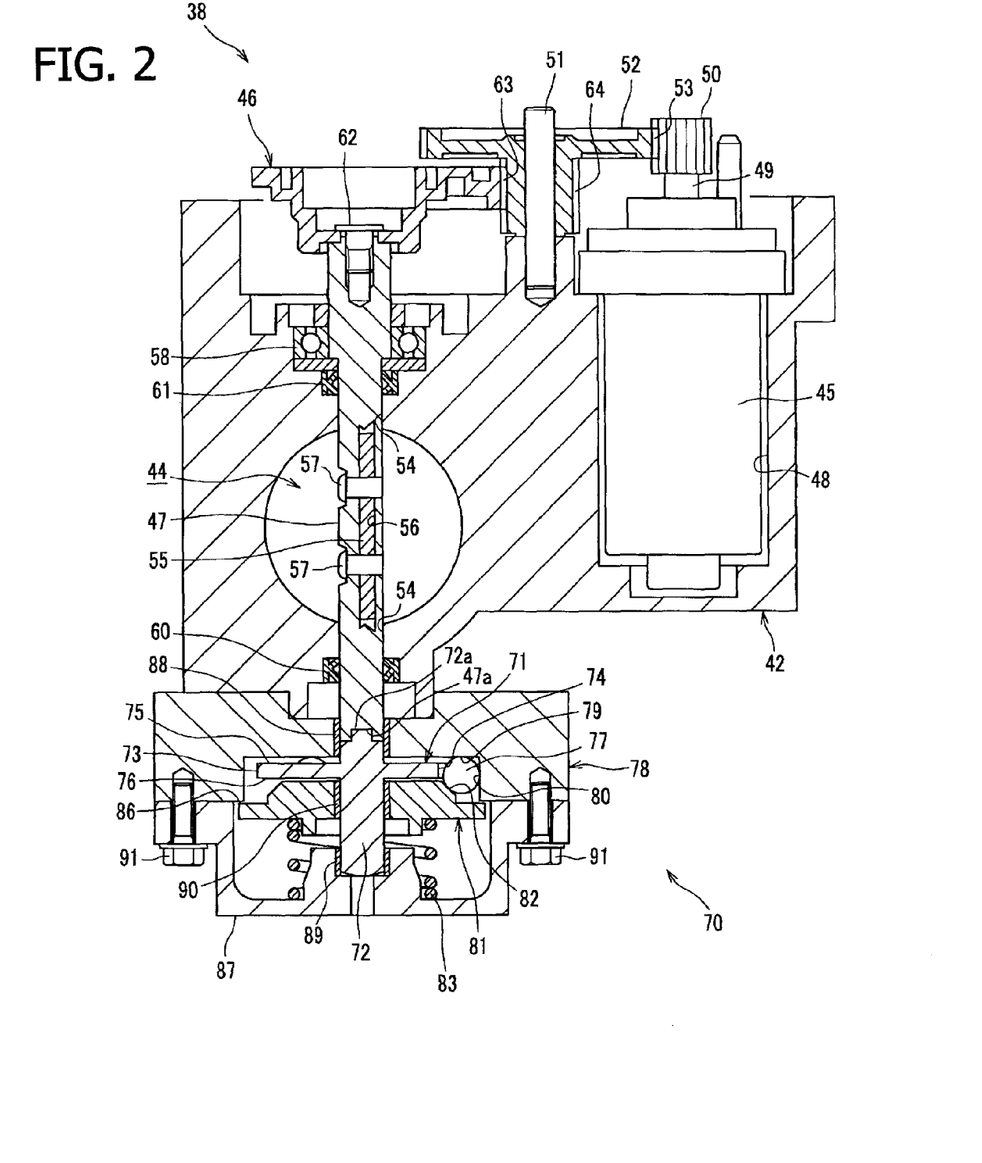
FIG. 2 is a schematic vertical sectional view of a back pressure valve incorporated in the fuel cell system.

FIG. 2 shows a schematic section of a back pressure valve incorporated in the fuel cell system.

Referring to FIG. 2, the back pressure valve 38 includes a housing 42 having a fluid path 44 formed in the inside thereof. In the housing 42, a rotational driving source 45 configured from a stepping motor, a DC servo motor or the like, a gear wheel plate 46 to which rotational driving force from the rotational driving source 45 is transmitted, a valve body driving shaft 47 secured to a lower central portion of the gear wheel plate 46 and so forth are provided. It is to be noted that a cover member (not shown) is mounted on an upper end face of the housing 42 in FIG. 2.

The fluid path 44 formed in the housing 42 has a circular cross section and is configured such that the pipes c4 and c5 shown in FIG. 1 are connected to the opposite sides of the fluid path 44.

The rotational driving source 45 is accommodated in a concave portion 48 formed on the housing 42, and a driving gear wheel 50 is fixed to an output power shaft 49 of the rotational driving source 45. The driving gear wheel 50 engages with a large diameter gear wheel portion 53 provided on an idle gear wheel 52 supported for rotation on an idle shaft 51.

The valve body driving shaft 47 is inserted in through-holes 54 formed in the housing 42, and a valve body 55 for opening and closing the fluid path 44 is connected to a portion of the valve body driving shaft 47 positioned in the fluid path 44. The valve body 55 has a circular shape corresponding to the sectional shape of the fluid path 44 and is fixed by screw members 57 in a state in which it is inserted in a through-hole 56 of a rectangular cross section in the form of a slit formed in the valve body driving shaft 47.

The valve body driving shaft 47 to which the valve body 55 is secured is supported for rotation on the housing 42 and a body member 78 hereinafter described through the bearing 58 and the collar member 88. A seal member 60 for preventing gas leakage from the fluid path 44 to the outside of the housing 42 and another seal member 61 for preventing gas leakage from the fluid path 44 to a space in the housing 42 in which the gear wheel plate 46 and so forth are accommodated are mounted on the housing 42.

A spring member (not shown) for biasing the valve body 55 so as to pivotally move the valve body 55 in a valve closing direction is provided at an outer peripheral portion of the valve body driving shaft 47 on the gear wheel plate 46 side. In particular, the back pressure valve 38 here is a valve device of the normally closed type in which, in a normal state, that is, in an off state of the rotational driving source 45, the valve body 55 is retained at the fully closed position at which the fluid path 44 is fully closed by the biasing force of the spring member. It is to be noted that FIG. 2 shows the valve body 55 in a state retained at the fully opened position at which the fluid path 44 is fully opened.

The gear wheel plate 46 is fixed to an upper end portion of the valve body driving shaft 47 by a screw member 62. It is to be noted that the opening of the valve body 55 is detected by detecting the rotational direction position of the gear wheel plate 46 by a rotation sensor (not shown).

The gear wheel plate 46 is made of hard resin and is pivotally driven by the pivoting force received from the idle gear wheel 52. The gear wheel plate 46 includes a gear portion 63 at part of an outer peripheral portion thereof, and the gear portion 63 meshes with a small diameter gear portion 64 provided on the idle gear wheel 52.

Now, the locking mechanism 70 is described.

The locking mechanism 70 includes a disk 71, a ball 77, a body member 78, a holder member 81 and a spring member 83. In the locking mechanism 70, the ball 77 is clamped by and among an engaging face 82 of the holder member 81, which receives the biasing force from the spring member 83, and an axial direction restriction face 79 and an inner circumferential face 80 of the body member 78 so that a rotational direction position of a rotational shaft 72 of the disk 71 is retained.

The disk 71 includes the rotational shaft 72 rotatable together with the valve body driving shaft 47 for driving the valve body 55. A rectangular projection 72a is provided at an end portion of the rotational shaft 72 on the valve body driving shaft 47 side. The projection 72a is fitted in a grooved portion 47a having a linear rectangular cross section and is provided at an end portion of the valve body driving shaft 47 on the rotational shaft 72 side so that an engaging state is established in which the valve body driving shaft 47 and the rotational shaft 72 can rotate together with each other. However, the valve body driving shaft 47 and the rotational shaft 72 may otherwise be formed integrally with each other.

Figure 3A:
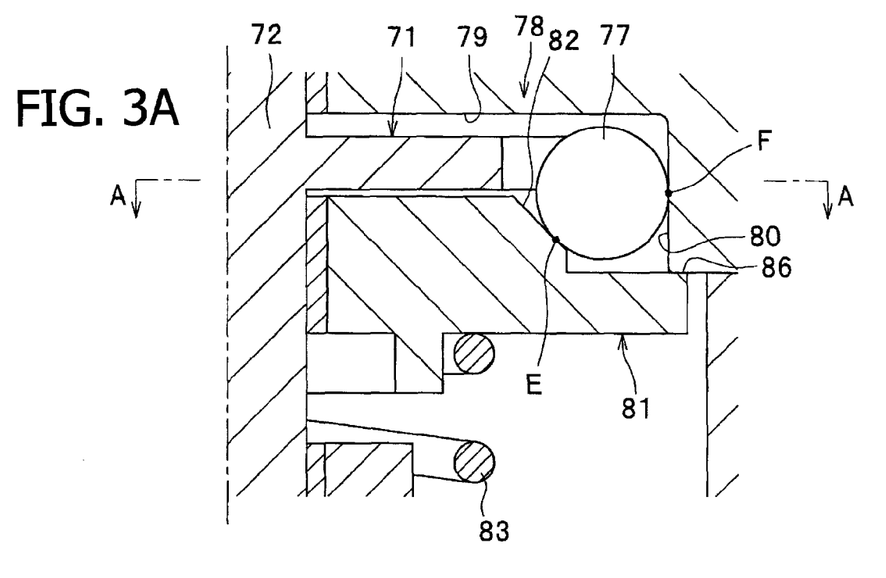
FIGS. 3A and 3B are schematic sectional views showing a valve body at the fully closing position and illustrating operation of the locking mechanism, and wherein FIG. 3A particularly is a vertical sectional view taken along line B-O of FIG. 3B and FIG. 3B particularly is a transverse sectional view taken along line A-A of FIG. 3A.
Figure 3B:
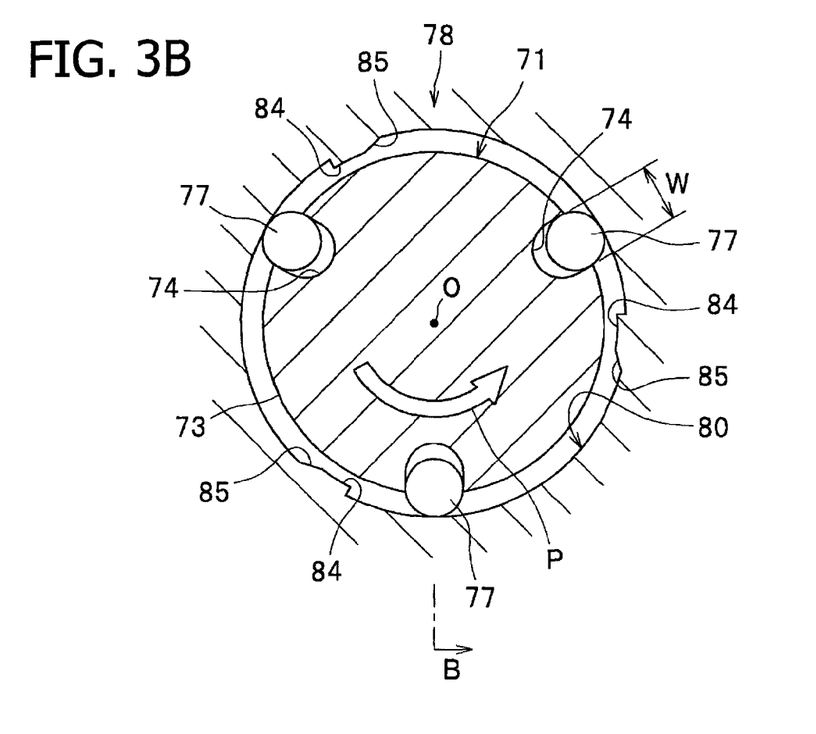

Further, a U-formed cutout groove 74 shown in FIG. 3B is formed on an outer circumferential face 73 of the disk 71 along a radial direction. The ball 77 is disposed in the cutout groove 74. As the ball 77, for example, a steel ball is used. Here, the groove width W illustrated in FIG. 3B of the cutout groove 74 is set to a size corresponding to the diameter of the ball 77, that is, to a size a little greater than the diameter of the ball 77. Accordingly, while the ball 77 can move in a radial direction in the cutout groove 74, movement thereof in a circumferential direction is restricted by a groove wall of the cutout groove 74.

Three such balls 77 are disposed in such three cutout grooves 74 formed in an equally spaced relationship from each other on the circumference of the disk 71. However, the number of the balls 77 and cutout grooves 74 can be set suitably.

The body member 78 has a substantially bottomed cylindrical shape in order to accommodate the disk 71 and the balls 77 in the inside thereof. The body member 78 has an axial direction restriction face 79 positioned in an opposed relationship to one end face 75 of the disk 71 in an axial direction and an inner circumferential face 80 positioned in an opposed relationship to the outer circumferential face 73 of the disk 71.

The inner circumferential face 80 of the body member 78 has protrusions 84 which project inwardly as seen in FIG. 3B. In particular, the inner diameter R1 of the inner face of the protrusions 84 is set smaller than the inner diameter R2 of the inner circumferential face 80 excluding the protrusion 84, as seen in FIG. 4C. Further, as seen in FIG. 3B, a guide face 85 for smoothly guiding a ball 77 along the inner face of a protrusion 84 when the ball 77 contacts with the protrusion 84 is formed adjacent each of the protrusions 84. Thus, in a state in which the ball 77 exists at a position opposing to the protrusion 84, the ball 77 is clamped by and among an engaging face 82 of the holder member 81 which receives the biasing force of the spring member 83, the axial direction restriction face 79 and the protrusion 84.

The holder member 81 is disposed in an opposing relationship to the other end face 76 in the axial direction of the disk 71. This holder member 81 has an engaging face 82 having an outer diameter gradually decreasing toward the ball 77 and capable of engaging with the ball 77. Here, the engaging face 82 exhibits a tapering shape or conical side face shape having an outer diameter which decreases linearly toward the ball 77. However, the engaging face 82 may otherwise exhibit, for example, a shape which is part of a spherical shape or the like.

A movement restriction portion 86 is provided on the holder member 81 such that it is engaged with the body member 78 to restrict movement of the holder member 81 towards the ball 77 side. Then, in a state in which the retention of the rotational direction position of the rotational shaft 72 is canceled, the movement restriction portion 86 engages with the body member 78 and the biasing force of the spring member 83 is applied to the body member 78 through the movement restriction portion 86.

The spring member 83 biases the holder member 81 toward the ball 77 and is formed using, for example, a coil spring.

The locking mechanism 70 further includes a spring holder 87 for receiving a lower end of the spring member 83 in FIG. 2. In particular, the spring member 83 is interposed between the holder member 81 and the spring holder 87 and biases the holder member 81 in the upward direction in FIG. 2. The spring holder 87 is secured to a lower face in FIG. 2 of the body member 78 by means of, for example, a screw member 91.

The rotational shaft 72 of the disk 71 is supported for sliding movement by a collar member 88 force fitted in an inner circumferential face of a through-hole formed along the center axis of the body member 78, and another collar member 89 force fitted in an inner circumferential face of another through-hole formed along the center axis of the spring holder 87. Meanwhile, the holder member 81 is supported for sliding movement with respect to the rotational shaft 72 of the disk 71 by a collar member 90 force fitted in an inner circumferential face of a further through-hole formed along the center axis of the holder member 81. The collar members 88 to 90 are each formed from a cylindrical member made of, for example, sintered metal and function as bearings.

The disk 71, body member 78 and holder member 81 with which the balls 77 are engaged are formed from metal material such as, for example, iron or steel and are preferably formed by wholly or partly applying a surface hardening process such as heat treatment so as to have a predetermined hardness so that they are not damaged even if the balls 77 are pressed thereagainst.

The locking mechanism 70 configured in such a manner as described above operates in the following manner.

FIGS. 3A and 3B illustrate operation of the locking mechanism and show the valve body in the fully closing position. FIG. 3A is a vertical sectional view taken along line B-O of FIG. 3B and FIG. 3B is a transverse sectional view taken along line A-A of FIG. 3A.

In FIGS. 3A and 3B, the locking mechanism 70 is in a state in which the retention of the rotational direction position of the rotational shaft 72 of the disk 71 is canceled, that is, in an unlocked state. Here, when the valve body 55 is in the fully closed position, the locking mechanism 70 is in the unlocked state.

As seen in FIGS. 3A and 3B, in the unlocked state of the locking mechanism 70, the holder member 81 for transmitting the biasing force of the spring member 83 engages at the movement restriction portion 86 thereof with the body member 78 to restrict movement of the body member 78 to the ball 77 side. Accordingly, the biasing force of the spring member 83 is not transmitted to the ball 77. Therefore, the ball 77 is placed in a two-point contacting state at a point E and another point F and is not restricted in movement thereof.

However, the ball 77 may be placed otherwise in a three-point contacting state such that the upper end of the ball 77 and the axial direction restriction face 79 contact slightly without pressing against each other. With the configuration just described, in the unlocked state, the ball can move freely among the engaging face 82, axial direction restriction face 79 and inner circumferential face 80 thereby to prevent generation of a strange noise.

In order to establish a state in which the rotational direction position of the rotational shaft 72 of the disk 71 is retained, that is, a locked state, the valve body driving shaft 47 shown in FIG. 2 is rotated to rotate the rotational shaft 72 of the disk 71 in the direction indicated by an arrow mark P as seen in FIG. 3B. At this time, the disk 71 rotates while being accompanied by the balls 77 disposed in the U-shaped cutout grooves 74. In this manner, in the unlocked state, the rotational shaft 72 and hence the valve body driving shaft 47 can rotate smoothly with low sliding resistance.

Figure 4A:
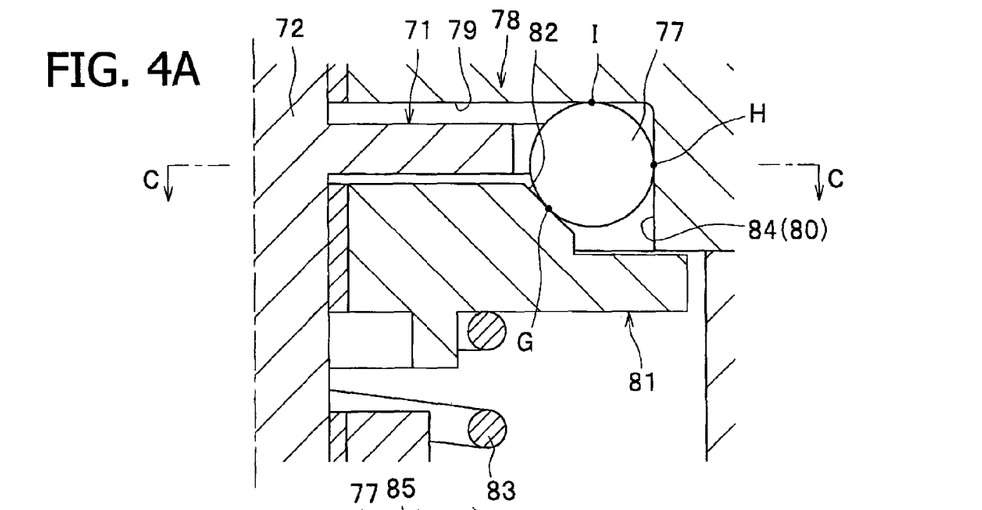
FIGS. 4A to 4C are schematic sectional views showing the valve body in the fully open state and illustrating operation of the locking mechanism, and wherein FIG. 4A particularly is a vertical sectional view taken along line D-O of FIG. 4B, FIG. 4B particularly is a transverse sectional view taken along line C-C of FIG. 4A and FIG. 4C particularly is a detailed view of a portion indicated by reference character J in FIG. 4B.
Figure 4B:
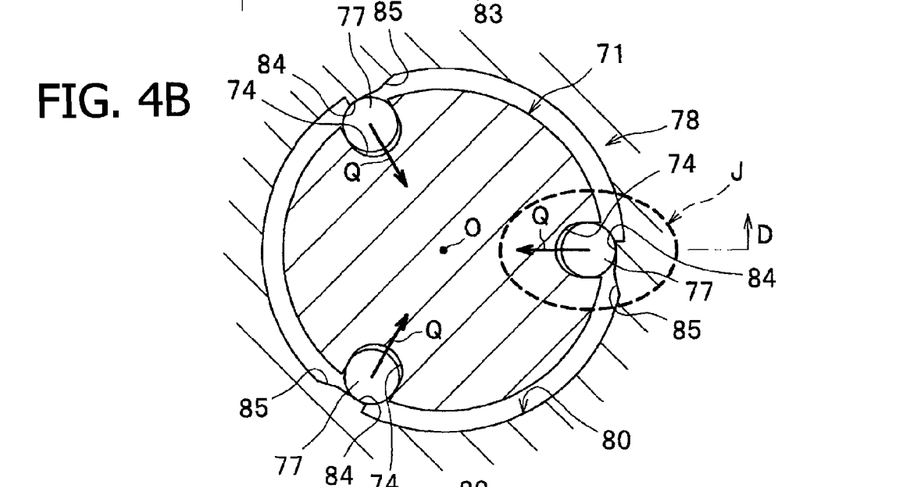
Figure 4C:
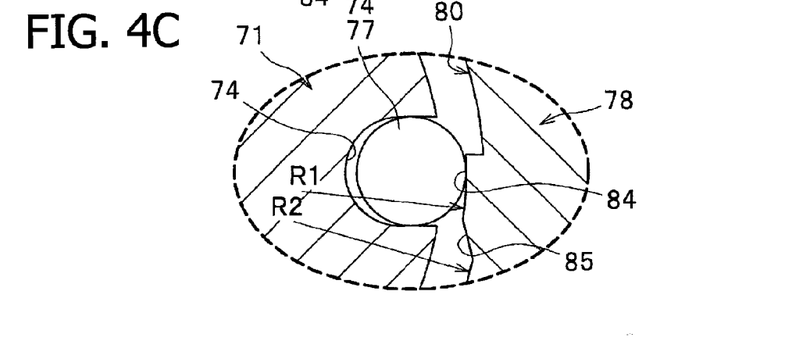

FIGS. 4A to 4C illustrate operation of the locking mechanism and show the valve body at the fully open position. FIG. 4A is a vertical sectional view taken along line D-O of FIG. 4B, FIG. 4B is a transverse sectional view taken along line C-C of FIG. 4A and FIG. 4C is a detailed view of a portion indicated by reference character J in FIG. 4B.

In FIGS. 4A to 4C, the locking mechanism 70 is in a state in which the rotational direction position of the rotational shaft 72 of the disk 71 is retained, that is, in a locked state. Here, when the valve body 55 is at the fully open position, the locking mechanism 70 is in the locked state.

Referring to FIGS. 4A to 4C, when the rotational shaft 72 of the disk 71 is rotated until the balls 77 disposed in the cutout grooves 74 are engaged with the protrusions 84 formed on the inner circumferential face 80 of the body member 78, the balls 77 are moved inwardly in radial directions, that is, in the directions indicated by arrow marks Q in FIG. 4B. It is to be noted that the valve body driving shaft 47 shown in FIG. 2 with which the rotational shaft 72 is engaged is restricted from rotation by a stopper (not shown) at the fully open position thereof rotated by 90 degrees from the fully closed position, the balls 77 do not ride over the positions at which they oppose to the protrusions 84.

Each of the balls 77 moved inwardly in the radial directions, that is, in the directions of the arrow marks Q in FIG. 4B, is engaged with and moved upwardly in the axial direction by the engaging face 82 of the holder member 81 until it is engaged with the axial direction restriction face 79 of the body member 78. Thereafter, the ball 77 moves the holder member 81 to the opposite side to the axial direction restriction face 79 against the biasing force of the spring member 83. Thereupon, the ball 77 contacts with and is clamped at three points G, H and I shown in FIG. 4A, which is a three-point contacting state.

By the clamping of the ball 77, static frictional force is generated between the ball 77 and the three engaging points with the ball 77, and a retaining moment or retaining force, which is given as the product of the static frictional force and the distance from the center of rotation to the engaging point with the ball, acts upon the engaging point. The ball 77 is restrained by the retaining moment, and since the restrained ball 77 is positioned in the cutout groove 74, the valve body driving shaft 47 shown in FIG. 2 by which the rotational shaft 72 is engaged can be retained at the fully open position.

Here, the retaining moment by the clamping of the ball 77 is set by the spring load to the spring member 83. Accordingly, the retaining moment for retaining the rotational direction position of the rotational shaft 72 and hence of the valve body driving shaft 47 can be adjusted by changing the spring load to the spring member 83.

Cancellation of the locked state is carried out by rotating the valve body driving shaft 47 shown in FIG. 2 to rotate the rotational shaft 72 of the disk 71 in the opposite direction to the direction of the arrow mark P in FIG. 3B. At this time, the back pressure valve 38 causes the rotational driving source 45 shown in FIG. 2, which drives the valve body driving shaft 47 to rotate, to generate rotational driving force higher than the retaining moment arising from the clamping of the balls 77. In this manner, only by causing the rotational driving source 45 to generate rotational driving force higher than the retaining moment, retention of the rotational direction position of the rotational shaft 72, that is, the locked state, can be canceled without the necessity for a special driving mechanism.

As described above, the locking mechanism 70 according to the present embodiment includes the disk 71 having the rotational shaft 72 rotatable together with the valve body driving shaft 47 for driving the valve body 55 and having the cutout groove 74 formed on an outer circumferential face 73 thereof, the ball 77 disposed in the cutout groove 74, the body member 78 having an axial direction restriction face 79 positioned in an opposing relationship to one end face 75 of the disk 71 in an axial direction and an inner circumferential face 80 positioned in an opposing relationship to the outer circumferential face 73 of the disk 71, the holder member 81 having the engaging face 82 which is disposed in an opposing relationship to the other end face 76 of the disk 71 in the axial direction and has a diameter gradually decreasing toward the ball 77 and is engageable with the ball 77, and the spring member 83 configured to bias the holder member 81 toward the ball 77, and wherein the ball 77 is clamped by and among the engaging face 82 of the holder member 81 which is acted upon by the biasing force of the spring member 83, the axial direction restriction face 79 and the inner circumferential face 80 so that the rotational direction position of the rotational shaft 72 is retained.

In the present embodiment having such a configuration as described above, static frictional force is generated between the ball 77 and the point (particularly the three points) which engages with the ball 77, and a retaining moment or retaining force, which is given as the product of the static frictional force and the distance from the center of rotation to the engaging point with the ball, acts upon the engaging point. The ball 77 is restrained by the retaining moment, and since the restrained ball 77 is positioned in the cutout groove 74, the rotational direction position of the rotational shaft 72 is retained.

Accordingly, the valve body 55 can be retained at the fully open position without energization, and power consumption is reduced. Besides, since no special driving mechanism is required to cancel the retention of the valve body 55 at the fully open position, a simple structure can be implemented and reduction in size and weight and reduction in cost can be anticipated.

In particular, with the locking mechanism for a valve device, the valve body 55 can be retained at the fully open position without energization, and no special driving mechanism for canceling the retention of the valve body 55 at the fully open position is required.

Further, in the present embodiment, the holder member 81 has the movement restriction portion 86 provided thereon for engaging with the body member 78 to restrict movement of the holder member 81 to the ball 77 side, and in the state in which the retention of the rotational direction position of the rotational shaft 72 is cancelled, the movement restriction portion 86 is engaged with the body member 78 such that the biasing force of the spring member 83 is applied to the body member 78 through the movement restriction portion 86.

In the present embodiment having such a configuration as described above, in the state in which the retention of the rotational direction position of the rotational shaft 72 is canceled, the biasing force of the spring member 83 is not transmitted to the ball 77. Therefore, the ball is not restricted in movement thereof. As a result, the rotational shaft 72 and hence the valve body driving shaft 47 can be rotated smoothly with low sliding resistance.

Further, in the present embodiment, the inner circumferential face 80 of the body member 78 has the protrusion 84 projecting inwardly, and in the state in which the ball 77 exists at the position opposing to the protrusion 84, the ball 77 is clamped by and among the engaging face 82 of the holder member 81, which receives the biasing force from the spring member 83, the axial direction restriction face 79 and the protrusion 84 such that the rotational direction position of the rotational shaft 72 is retained.

In the present embodiment having such a configuration as described above, when the rotational shaft 72 of the disk 71 is rotated and the ball 77 disposed in the cutout groove 74 is engaged with the protrusion 84 formed on the inner circumferential face 80 of the body member 78, the ball 77 is moved inwardly in a radial direction and is engaged with and moved upwardly in the axial direction by the engaging face 82 of the holder member 81 until it is engaged with the axial direction restriction face 79 of the body member 78. Then, the ball 77 moves the holder member 81 to the opposite side to the axial direction restriction face 79 against the biasing force of the spring member 83. Thereupon, the ball 77 contacts with and is clamped among the three points engaging with the ball 77, and consequently, a retaining moment acts upon the engaging points. As a result, the rotational direction position of the rotational shaft 72 is retained.

Further, in the present embodiment, the disk 71 has the plural cutout grooves 74 formed thereon, and the ball 77 is disposed in each of the plural cutout grooves 74, and besides, the engaging face 82 of the holder member 81 has a tapering shape having a diameter linearly decreasing toward the ball 77.

In the present embodiment having such a configuration as described above, the biasing force of the spring member 83 can be distributed to the plural balls 77 by the engaging face 82 of a simple shape. Accordingly, the retaining moment is generated at a number of places equal to the number of the balls 77, and the rotational shaft 72 is retained stably at the plural places in a circumferential direction. Therefore, the rotational direction position of the rotational shaft 72 can be retained with a higher degree of certainty.

While the present invention has been described in connection with the preferred embodiment thereof, the present invention is not limited to the configuration described hereinabove in connection with the embodiment thereof but can be suitably carried out in various modified configurations without departing from the spirit and scope thereof including suitable combinations and selections of the components described in connection with the embodiment.

For example, while the locking mechanism 70 in the embodiment described above is configured such that the rotational shaft 72 can be retained at the rotational direction position at which the valve body 55 exhibits the fully open position, the present invention is not limited to this. The locking mechanism 70 may be configured otherwise such that, for example, the rotational shaft 72 can be retained at the rotational direction position at which the valve body 55 exhibits the fully closed position. Further, the locking mechanism 70 may be configured such that the circumferential direction positions and the number of such protrusions 84 are changed so that the rotational shaft 72 can be retained at an arbitrary rotational direction position smaller than 360 degrees. It is to be noted that, where the locking mechanism 70 is configured such that, for example, the ball 77 can ride over the position at which it is opposed to the protrusion 84 so that the rotational shaft 72 can be retained at the rotational direction position at which the valve body 55 exhibits a half open position, preferably a pair of guide faces 85 (refer to FIG. 3B) are formed on the opposite sides of and adjacent each protrusion 84.

Further, while the locking mechanism 70 in the embodiment described above is applied to a butterfly valve which opens and closes a fluid path by means of the disk-shaped valve body 55, the present invention is not limited to this but can be applied, for example, also to a ball valve which opens and closes a fluid path by means of a spherical valve body having a through-hole. In this instance, the rotational shaft 72 of the disk 71 is engaged with a valve body driving shaft for driving the spherical valve body. Further, the locking mechanism 70 can also be applied to a valve of the type which includes a gear wheel to which rotational driving force of a rotational driving source is transmitted and a rack section having rack teeth for meshing with the gear wheel and configured to convert rotational movement of the gear wheel into linear movement and move together with the valve body and besides the valve body moves in a perpendicular direction from the valve seat face. In this instance, the rotational shaft 72 of the disk 71 is engaged, for example, with a rotational shaft of the gear wheel as the valve body driving shaft.

Further, while the locking mechanism 70 in the embodiment described above is applied to the back pressure valve 38 provided in the cathode system 16 of the fuel cell system 10, the present invention is not limited to this but can be applied to a valve device which is installed at an arbitrary place of various systems or apparatus.

We claim:

1. A locking mechanism for a valve device, the valve device including a valve body for opening and closing a fluid path, comprising:
    a disk having a rotational shaft rotatable together with a valve body driving shaft for driving the valve body and having a cutout groove formed on an outer circumferential face thereof;
    a ball disposed in said cutout groove;
    a body member comprising
        an axial direction restriction face positioned in an opposed relationship with a first end face of said disk in an axial direction, and
        an inner circumferential face positioned in an opposed relationship with the outer circumferential face of said disk;
    a holder member comprising an engaging face which is disposed in an opposed relationship to a second end face of said disk in the axial direction, the holder member having a diameter gradually decreasing toward said ball and being engageable with said ball; and
    a spring member configured to bias said holder member toward said ball,
    wherein said ball is clamped by and among the engaging face of said holder member, the axial direction restriction face and the inner circumferential face so that a rotational direction position of the rotational shaft is retained, and
    wherein the locking mechanism is capable of retaining the valve body at a predetermined opened position.

2. The locking mechanism for a valve device according to claim 1,
    wherein said holder member comprises a movement restriction portion provided thereon for engaging with said body member to restrict movement of said holder member to the ball side; and
    wherein, in a state in which the retention of the rotational direction position of said rotational shaft is cancelled, said movement restriction portion is engaged with said body member such that the biasing force of said spring member is applied to said body member through said movement restriction portion.

3. The locking mechanism for a valve device according to claim 1,
    wherein the inner circumferential face of said body member comprises a protrusion projecting inwardly; and
    wherein, in a state in which said ball is disposed at a position opposed to said protrusion, said ball is clamped by and among the engaging face of said holder member, the axial direction restriction face and the protrusion such that the rotational direction position of the rotational shaft is retained.

4. The locking mechanism for a valve device according to claim 1,
    wherein said disk has a plurality of cutout grooves formed thereon;
    wherein the locking mechanism comprises a plurality of balls, one of each of said balls being disposed in each of the plurality of cutout grooves; and wherein the engaging face of said holder member has a tapering shape having a diameter linearly decreasing toward said plurality of balls.

5. The locking mechanism for a valve device according to claim 1, wherein, where the retention of the rotational direction position of said rotational shaft is to be cancelled, a rotational driving force higher than a retention moment by the clamping of said ball is generated by a rotational driving source for rotationally driving said valve body driving shaft.

6. The locking mechanism for a valve device according to claim 1, wherein the retention moment by the clamping of said ball is set by a spring load provided by said spring member.

7. A valve device, comprising:
a valve body for opening and closing a fluid path, and
a locking mechanism, comprising
 a disk having a rotational shaft rotatable together with a valve body driving shaft for driving the valve body and having a cutout groove formed on an outer circumferential face thereof;
 a ball disposed in said cutout groove;
 a body member comprising
  an axial direction restriction face positioned in an opposed relationship with a first end face of said disk in an axial direction, and
  an inner circumferential face positioned in an opposed relationship with the outer circumferential face of said disk;
 a holder member comprising an engaging face which is disposed in an opposed relationship to a second end face of said disk in the axial direction, the holder member having a diameter gradually decreasing toward said ball and being engageable with said ball; and
 a spring member configured to bias said holder member toward said ball,
wherein said ball is clamped by and among the engaging face of said holder member, the axial direction restriction face and the inner circumferential face so that a rotational direction position of the rotational shaft is retained, and
wherein the locking mechanism is capable of retaining the valve body at a predetermined opened position.

8. The valve device according to claim 7,
wherein said holder member comprises a movement restriction portion provided thereon for engaging with said body member to restrict movement of said holder member to the ball side; and
wherein, in a state in which the retention of the rotational direction position of said rotational shaft is cancelled, said movement restriction portion is engaged with said body member such that the biasing force of said spring member is applied to said body member through said movement restriction portion.

9. The valve device according to claim 7,
wherein the inner circumferential face of said body member comprises a protrusion projecting inwardly; and
wherein, in a state in which said ball is disposed at a position opposed to said protrusion, said ball is clamped by and among the engaging face of said holder member, the axial direction restriction face and the protrusion such that the rotational direction position of the rotational shaft is retained.

10. The valve device according to claim 7,
wherein said disk has a plurality of cutout grooves formed thereon;
wherein the locking mechanism comprises a plurality of balls, one of each of said balls being disposed in each of the plurality of cutout grooves; and
wherein the engaging face of said holder member has a tapering shape having a diameter linearly decreasing toward said plurality of balls.

11. The valve device according to claim 7, wherein, where the retention of the rotational direction position of said rotational shaft is to be cancelled, a rotational driving force higher than a retention moment by the clamping of said ball is generated by a rotational driving source for rotationally driving said valve body driving shaft.

12. The valve device according to claim 7, wherein the retention moment by the clamping of said ball is set by a spring load provided by said spring member.

* * * * *